United States Patent [19]

Niederst et al.

[11] 4,083,671

[45] Apr. 11, 1978

[54] DEVICE FOR THE PRODUCTION OF MOLDED ARTICLES FROM FOAMABLE PLASTICS

[75] Inventors: Jean-Pierre Niederst, Schotmar; Karl Holzinger, Bad Oeynhausen, both of Germany

[73] Assignee: Herbert Kannegiesser Kommanditgesellschaft, Vlotho, Germany

[21] Appl. No.: 755,882

[22] Filed: Dec. 30, 1976

[30] Foreign Application Priority Data

Jan. 12, 1976 Germany .......................... 2600900
Jan. 12, 1976 Germany ...................... 7600626[U]

[51] Int. Cl.² ............................................. B29C 1/16
[52] U.S. Cl. .............................. 425/450.1; 425/451.9; 425/4 R; 425/817 R; 249/161
[58] Field of Search .................... 425/4, 817, 25; 249/170

[56] References Cited

U.S. PATENT DOCUMENTS

| | | | |
|---|---|---|---|
| 2,489,486 | 11/1949 | Glynn | 425/25 |
| 2,638,629 | 5/1953 | Heintz | 425/25 |
| 2,736,060 | 2/1956 | Glynn | 425/25 |
| 2,812,547 | 11/1957 | Duerksen et al. | 425/25 X |
| 3,023,457 | 3/1962 | Sunday | 425/25 |
| 3,161,911 | 12/1964 | Mathews | 425/817 X |
| 3,203,043 | 8/1965 | Mathews | 425/817 X |
| 3,602,949 | 9/1971 | Kaut | 425/817 X |
| 3,624,672 | 11/1971 | Spivy | 425/817 X |
| 4,012,186 | 3/1977 | Ramaggotti et al. | 425/817 X |
| 4,015,920 | 4/1977 | Nodeist et al. | 425/817 X |

*Primary Examiner*—J. Howard Flint, Jr.
*Attorney, Agent, or Firm*—Sughrue, Rothwell, Mion, Zinn and Macpeak

[57] ABSTRACT

A pair of spaced, parallel guide posts 18, 19 are mounted on and perpendicular to a lower platen 12 which supports a first mold half 20. A traversing member 33 is slidably mounted on the guide posts, and an upper platen 13 supporting a second mold half 21 is hinged to the traversing member for pivotal movement about an axle 14 laterally offset from the lower platen. A double acting operating cylinder 15 is hingedly mounted to the lower platen near the guide posts and to the upper platen near the hinged axle 14, and controls both the movement of the upper platen toward and away from the lower platen in a parallel orientation, and the pivotal movement of the upper platen after the traversing member has reached its upper limit of travel.

4 Claims, 3 Drawing Figures

DEVICE FOR THE PRODUCTION OF MOLDED ARTICLES FROM FOAMABLE PLASTICS

The invention relates to a device for the production of molded articles from foamable plastics, especially polyurethane, where the parts of a bipartite or split mold, in which the molded articles are foamed, are attached to two superposed fixing plates of a mold carrier, and the upper of the two fixing plates is moveable, while maintaining its parallel position in relation to the lower fixing plate, toward said fixing plate, and may be moved back again, furthermore the upper fixing plate may be swivelled from its parallel position to the lower fixing plate, around an axis disposed laterally from it.

In case of a known arrangement of the above mentioned construction (Germ. AS 2,146,245) the swivelling of the upper fixing plate as well as movement of it takes place while maintaning its parallel position in relation to the lower fixing plate (stroke [lift] about 20 mm) by means of an operating cylinder while interposing a toggle joint support. Furthermore several so-called return elements are disposed, consisting essentially of compression springs guided on tie rods and in spring pots, for the movement of the upper fixing plate while maintaining its parallel position in relation to the lower fixing plate. The expenditure for the above mentioned movements (parallel stroke and swivelling), is therefore considerable, which is a disadvantage. A further disadvantage is that this apparatus operates with passive pressure in closing position, or in the position in which the mold is closed because of the development of the toggle joint support. The parts of the mold thus, are merely moved in a dirction toward each other and are held in a position adjusted on the pressure lever of the toggle lever support. Thus, no automatic elimination of the gap takes place, for example in case of development of a gap between the parts of the mold because of wear of the separating surfaces, by continued movement of the upper part of the mold in direction toward the lower part of it. Furthermore, in case of an overfilling of the mold with plastics that are to be foamed, one must count with some damage to the parts of the mold and/or of the device because of the unyielding locking of the parts of the mold. The damage comes about because the foaming (expanding) mass of plastic in the case exerts a considerably greater pressure on the parts of the mold, the mixing plates and the toggle joint support than in case of a normal foaming process. In the case of this known device it is a disadvantage furthermore that because of the arrangement of the toggle joint support, as made, the space above the separating plane of the mold, after lifting off, or the parallel stroke of the upper fixing plate with the part located on this side, is not freely accessible from three sides. This known apparatus, consequently, is not suited particularly advantageously for the production of molded articles from expandable plastics.

In case of an other known apparatus of the initially mentined construction (Germ. AS 2,051,525) the swivelling axis around which the upper fixing plate can be swivelled, is mounted on a traverse, which is mounted moveable in height in guide rods. The guide rods stand perpendicularly on the lower stationary fixing plate. The moving of the upper fixing plate, while maintaining its parallel position in relation to the lower fixing plate, takes place by means of an operating cylinder with interposition of a stand moveable on a slanting plane. The swivelling of the upper fixing plate around the swivelling axis, disposed laterally of the latter, takes place by means of a per se complicated arrangement. Since both, the means for moving of the upper fixing plate, while maintaining its parallel position in relation to the lower fixing plate, as well as the means for swivelling of the upper fixing plate have been conceived around a swivelling axis disposed laterally of the latter, and in view of their use in an assembly line with several, successively arranged units, moveable on tracks and always equipped with one mold and two fixing plates, said means — viewed all together — are developed relatively expensive and consequently are not advantageously suited for an apparatus, which is not equipped with several of the previously mentioned units. This apparatus moreover operates in closing position, apparently exactly as the first mentioned known apparatus, namely with passive pressure. Furthermore the so-called mold space of this apparatus is not unqualifiedly accessible to the previously mentioned units because of the many guide rails.

An other disadvantage of the previously mentioned, known apparatus (Germ. AS 2,146,245 and AS 2,051,525) is that the position of the mold support, consisting essentially of the mold, the two fixing plates and the swivelling and locking arrangements, is not changeable. The changing of the position of the mold carrier is necessary, in order to be able to insert the expanding plastic, f. ex., chemically interreacting liquids, in a good sprue position into the mold and in order to ensure a good ventilation of it. In this respect, it has been known (Germ. Utility Pat. No. 7,219,751) to swivel the mold carrier around a first axle, which lies in the direction of the mold closing movement, and around a second axle which lies perpendicularly in relation to the first axle and in the center of gravity of the mold carrier, whereby it is provided furthermore that the first axle is mounted at its two ends in the legs of a U-shaped stirrup guided around the mold carrier, which (stirrup) as its rear side of the bridge and in the course of the second axle is mounted on the stand of the apparatus.

It has furthermore been known, to provide locking arrangements on the initially mentioned apparatusses for holding together of the parts of the mold during the expansion process and for tearing open of said mold after the expansion process, which apparatusses may be operated independently of the arrangements for moving and swivelling of the upper fixing plate. One of the known arrangements of this kind (Germ. AS 2,143,132) consists of two positively inter lockable units, whereby the locking and unlocking of the two units takes place by way of an operating cylinder that may be acted upon reciprocally, which is assigned to the unit with the locking element, movable in this respect.

The invention is based on the task of proposing an apparatus of the initially mentioned design, which is better suited than the previously known arrangements for the production of small molded articles. The device to be proposed, should thus have especially only few means, which are not particularly susceptible to breakdowns, for carrying out the movements mentioned, of the upper fixing plate, the holding together of the parts of the mold in the locking position is to take place with active pressure and from arrangements which to the farthest possible extent operate independently of the arrangements accomplishing the movements of the upper fixing plate, and which are disposed such that the space above the separating plane of the mold, at least after the lifting off or the parallel stroke of the upper fixing plate will be accessible together with the part of the mold located on said plate from three sides and without limitation. Furthermore, the position of the mold or of the mold carrier is to be changeable without impediment of its above mentioned accessibility from three sides.

The apparatus of the invention is characterized in that the upper fixing plate is mounted swivelable on a traverse which is moveable on two guide rods which are disposed standing perpendicularly on the lower fixing plate, and in that an operating cylinder, which may be acted upon on either side, has been disposed for both movements of the upper fixing plate (swivelling as well as moving toward the lower fixing plate and again away from it), which is mounted on the one hand on the upper fixing plate and on the other hand on the lower fixing plate.

By this combination of partly known characteristics, the execution of the mentioned movements of the upper fixing plate takes place in the sense of the pertinent part of the task of the invention, namely by only a few means which are not particularly susceptible to break downs.

In the sense of the task of the invention the device of the invention is equipped furthermore with arrangements for holding the parts of the mold together during the expansion process, which consists in a manner known per se of two units, which can be interlocked positively by means of an operating cylinder which can be acted upon on both sides, of which (units) one is attached on the upper fixing plate and one on the lower fixing plate, and in case of which the actual holding together of the parts of the mold takes place by action upon the operating cylinders. In this case it is an advantage and also in the sense of the task of the invention, whenever the units of the previously mentioned arrangements which are disposed on the lower fixing plate, are shaped such, that its elements facing the upper fixing plate will project beyond the lower fixing plate up to a line which corresponds approximately to the separating plane of the mold.

Thus the holding together of the parts of the mold during the expansion process takes place by means of arrangements which in this respect are not connected with said operating cylinder for moving of the upper fixing plate and also with active pressure. The active pressure is the result of the fact that the arrangements for holding together of the parts of the mold are equipped with operating cylinders which can be acted upon on both sides, which constantly press the parts of the mold together in the closing position. The space above the separating plane of the mold is accessible without limitation from three sides together with the part of the mold on the upper fixing plate even after lifting off or parallel stroke of said upper plate, because the units disposed on the lower fixing plate do not project, at least however do not project considerably beyond the separating plane of the mold.

In a further development of the apparatus of the invention provision has been made for the mold carrier, consisting of the two fixing plates, the traverse, the guide rods, the operating cylinder and the arrangements for holding together the parts of the mold, to be swivellable in a manner known per se, around a first axle, which lies in the direction of the movement for closing the mold, and around a second axle which lies perpendicularly in relation to the first axle and preferably in the center of gravity of the mold carrier, furthermore that the first axle is mounted below the lower fixing plate in the one leg of the two legs of an angle-shaped stirrup guided around the mold carrier, which (stirrup) is mounted on the reverse side of a second leg and, in the course of the second axle on the stand.

The position of the mold carrier of the arrangement is thus changeable in the sense of the last part of the task of the invention, with a view to a good sprue and ventilation position of the mold.

An apparatus of the initially mentioned design, which has all previously listed characteristics of the invention, is thus better suited than the known apparatusses mentioned for the production of small molded articles.

Subsequently additional advantageous characteristics of the apparatus of the invention are explained on the basis of an embodiment shown schematically in the drawing.

Figure 1:
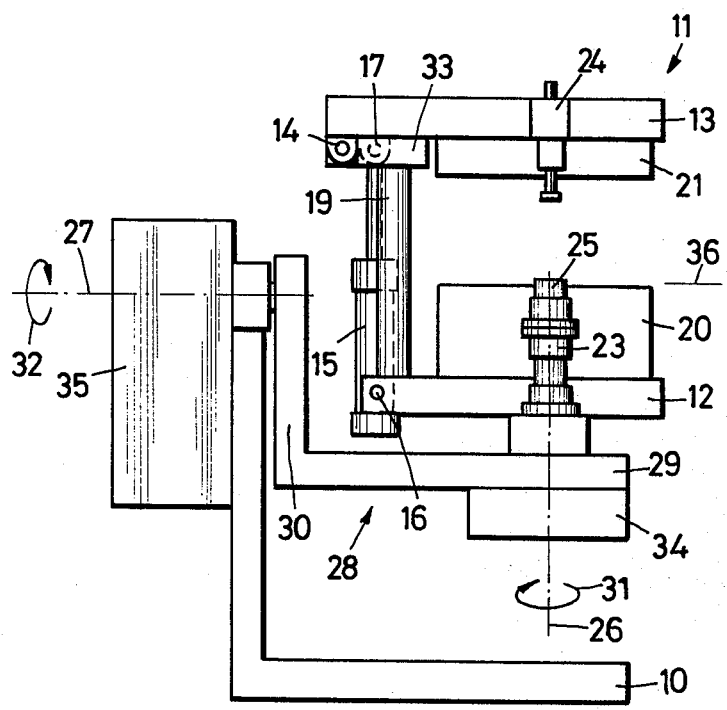
FIG. 1 shows a side view of the apparatus.

The reference numbers in the drawings signify:

10 = stand
11 = mold carrier
12 = fixing plate (lower, fixed)
13 = fixing plate (upper, moveable)
14 = swivelling axle (for swivelling of No: 13)
15 = operating cylinder (for moving No: 13)
16, 17 = bolts
18, 19 = guide rods
20, 21 = parts of the mold
22 = arrangement (for holding together the parts of the mold)
23, 24 = units (of No. 22, interlockable)
25 = element (upper of No: 23)
26 = axis (first)
27 = axis (second)
28 = stirrup (angular)
29, 30 = legs (of No: 28)
31 = arrow (rotational direction)
32 = arrow (rotational direction)
33 = traverse
34, 35 = driving arrangements
36 = line (separating plane of the mold)

Figure 2:
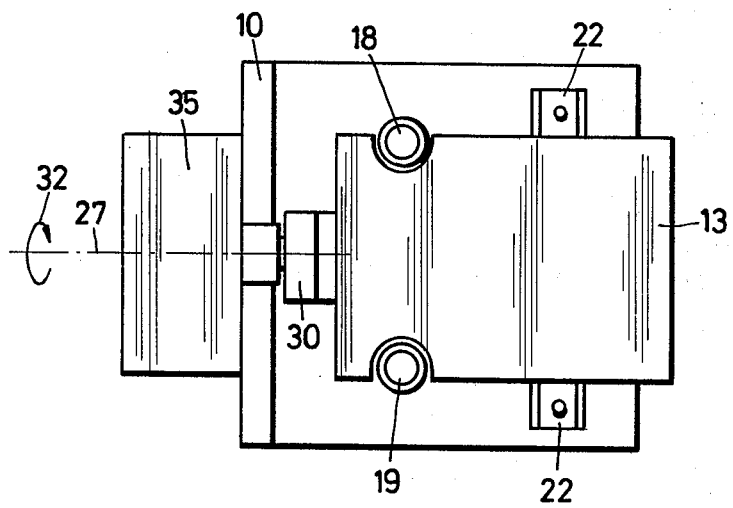
FIG. 2 shows a top view of the apparatus as in FIG. 1.
Figure 3:
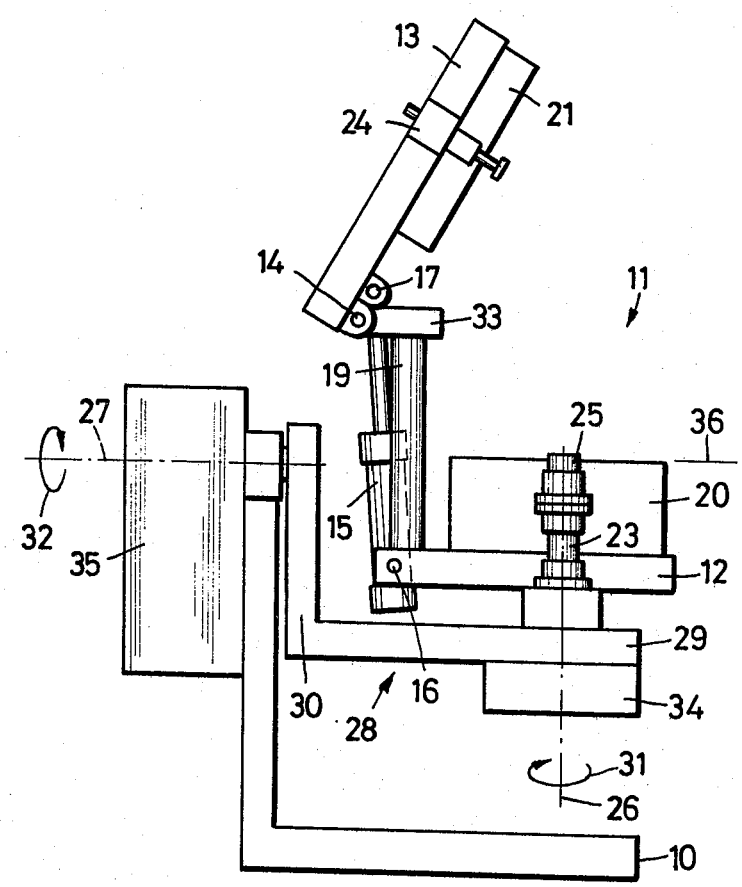
FIG. 3 shows a side view as in FIG. 1, but with the upper fixing plate lifted and swivelled.

The apparatus shown in FIGS. 1 to 3 consists of a stand 10, the angular stirrup 28, consisting of the two legs 29, 30 and the mold carrier 11, whereby the mold carrier 11 is mounted rotatably in the course of a first axis 26 on the leg 29 of the angular stirrup 28 and the angular stirrup 28 in the course of a second axis 27 on the stand 10 of the apparatus. The mold carrier 11, at the same time, is rotatable around the first axis 26 in the direction of arrow 31 and back again and the angular stirrup 28 with the mold carrier 11 mounted in said stirrup around the second axis 27 in the direction of arrow 32 and back again.

The first axis 26, in the embodiment shown in the figures, is about identical to the longitudinal axis of the mold carrier 11 and the second axis 27 lies about in the center of gravity of the mold carrier 11. The rotation of the mold carrier 11 or of the angular stirrup 28 around the axis 26, 27 takes place by means of driving arrangements 34, 35, known per se and not shown in detail in the drawings.

The mold carier 11 of the apparatus consists first of all of the lower fixing plate 12, on which the two guide rods 18, 19 are disposed standing perpendicularly. On these guide rods 18, 19, a traverse 33 has been placed moveably. The upper fixing plate 13 has been attached swivellable around the swivelling axle 14 on said traverse 33. An operating cylinder 15, which can be acted upon on both sides and which is mounted on the one hand on the upper fixing plate 13 and on the other hand on the lower fixing plate 12 by means of the bolts 16, 17 has been provided for moving of the traverse 33 with the upper fixing plate 13 mounted on said traverse, along the guide rods 18, 19, as well as for swivelling of the upper fixing plate 13 into a position according to FIG. 3 and back again. Furthermore, the interlocking units 23, 24 of the two arrangements 22 for holding together of the parts 20, 21 of the mold, in which the molded articles to be produced, are expanded are attached to the lower and upper fixing plate.

Everyone of the units 23 of the two arrangements 22 for holding together of the parts 20, 21 of the mold attached to the lower fixing plate 12, consists of an operating cylinder-which can be acted upon on both side — on the piston rod of which and in the extension of which (piston rod) a slide part moveable with said rod, has been arranged. The slide part, at its upper end, is shaped in the form of a claw in such a way that the latter is either locked or unlocked with the part corresponding to the former and likewise shaped in the manner of a claw, of the other unit 24, after moving of the slide part by means of the operating cylinder. The interlocking is comparable with the coupling together of two rods and consequently it is active only in connection with an action upon the operating cylinder of the units 23 in regard to the holding together of the parts 20, 21 of the mold during the expansion process. These details of the units 23, 24 of the arrangement 22 are not shown in the drawings.

The elements 25 of the units 23 attached to the lower fixing plate 12, facing the upper fixing plate 13, only go up to a line 36, which corresponds about to the separating plane of the mold, or to about the top edge of the lower part 20.

All other units and parts needed for the operation of the apparatus, are not shown in the figures, because they are known.

The method of operation of the mold carrier 11 of the apparatus is as follows:

Whenever the upper fixing plate 13 with the part 21 of the mold is in a position according to FIG. 3, then said plate should first be swivelled, for the foaming of a molded body in the mold, from this position in to a position according to FIG. 1. The swivelling is accomplished by means of the operating cylinder 15 that can be acted upon on both sides. When that is accomplished, then the upper fixing plate 13 with the part 21 of the mold, attached thereto is moved toward the fixing plate 12 by further pulling in of the piston rod the operating cylinder 15 while maintaining its parallel position to the lower fixing plate 12. In the course of the last part of this movement of the upper fixing plate 13, the claw-like lower part of the units 24 of the arrangements 22 for holding together of the parts 20, 21 of the mold, attached to said fixing plate, is introduced into the corresponding part of the units 23 of the above mentioned arrangements, attached on the lower fixing plate 12. Whenever the parts 20, 21 are superposed on one another, then the claw-like parts of the units 23, 24 of the arrangements 22 for holding together these parts of the mold are locked by means of the operating cylinders of the units 23. Since the operating cylinders of the units 23, do not only interlock the corresponding, clawlike parts of the units 23, 24 in the manner already explained, but also press the parts 20, 21 of the mold together by way of said first mentioned parts during the expansion process, the parts of the mold are held together with an active pressure in the closing position. This active pressure may be adjusted by arrangements known per se, f. ex., so-called pressure limiters, in such a way that in case of overfilling of the mold with plastic that is to be foamed, and conditional thereon with abnormally high expansion pressure in the mold, the upper part 21 of the mold will be lifted from the lower part 20 of said mold to such a point that the excess plastics material can escape from the mold. A damage of the parts 20, 21 of the mold or of parts of the mold carrier 11 is thus impossible in case of overfilling of the mold with plastic that is to be foamed, because of the ultimately yielding locking mechanism of the mold in the closing position. The parts 20, 21 of the mold in that case are therefore held together both with active pressure as well as resiliently, which is particularly advantageous.

Whenever the expansion process is completed, the mold is forced (torn) open by action upon the operating cylinders of the units 23, and at the same time the interlocking of the clawlike parts of the units 23, 24 is disengaged, so that the upper fixing plate 13 with the part 21 of the mold is moved first into a position as in FIG. 1, and so that it can then be swivelled into a position as in FIG. 3. The moving and swivelling of the upper fixing plate 13 with the part 21 of the mold, attached thereto, is accomplished by means of the operating cylinder 15.

The acting upon the operating cylinders of the units 23 takes place, with regard to the prying open of the mold and unlocking of the claw-like parts of the units 23, 24, in an opposite manner to the acting upon on said cylinders for the interlocking of the clawlike parts as well as the pressing together of the parts of the mold.

We claim:

1. An apparatus for producing molded articles from expandable plastics, such as polyurethane, comprising:
   a. a lower platen,
   b. a pair of spaced, parallel guide posts rigidly mounted on opposite sides of the lower platen proximate one end thereof and perpendicular thereto,
   c. a traversing member slidably mounted on the guide posts and parallel to the lower platen,
   d. an upper platen hinged at one end to the traversing member about an axis perpendicular to the guide posts and laterally offset from the lower platen, the upper platen resting on the traversing member in a position parallel to the lower platen and being pivotable about its hinge axis in a direction upward and away from the lower platen,
   e. a bipartite, split mold whose mating halves are individually mounted on the respective upper and lower platens facing each other, and
   f. a double acting extendable and retractable fluid operating cylinder and piston rod assembly, one end of said assembly being hingedly mounted to the lower platen and the other end of said assembly being hingedly mounted to the upper platen proximate the hinge axis thereof, whereby the upper platen and mold half mounted thereon is movable toward and away from the lower platen and mold half mounted thereon with both platens being maintained parallel to each other, and wherein the further extension of the cylinder and piston rod assembly after the traversing member has reached its upper limit of travel pivots the upper platen upward and away from the lower platen.

2. An apparatus as defined in claim 1, further comprising two mold locking units disposed on opposite sides of the platens, each unit comprising a pair of interlockable members individually mounted on the respective upper and lower platens, and a double acting fluid operating cylinder assembly for exerting pressure on the members when interlocked to urge the mold halves together.

3. An apparatus as defined in claim 2, wherein the interlockable members mounted on the lower platens extend upwardly to a height proximate the top of the mold half mounted on the lower platen.

4. An apparatus as defined in claim 3, further comprising an angular stirrup member pivotally mounting the lower platen and all of the structural components directly or indirectly mounted thereon for rotation about a first axis parallel to the guide posts, and an angular base stand pivotally mounting the stirrup member for rotation about a second axis perpendicular to the first axis and proximate the center of gravity of the structural components supported by the stirrup member.

* * * * *